United States Patent [19]

Hirota

[11] Patent Number: 5,125,876
[45] Date of Patent: Jun. 30, 1992

[54] DIFFERENTIAL GEAR WITH LIMITED SLIP AND LOCKUP CLUTCHES

[75] Inventor: Isao Hirota, Tochigi, Japan

[73] Assignee: Tochigifujisangyo Kabushiki Kaisha, Tochigi, Japan

[21] Appl. No.: 686,682

[22] Filed: Apr. 17, 1991

Related U.S. Application Data

[62] Division of Ser. No. 452,862, Dec. 19, 1989, Pat. No. 5,098,360.

[30] Foreign Application Priority Data

Dec. 26, 1988 [JP] Japan .................. 63-326075
Jul. 20, 1989 [JP] Japan .................. 1-84541
Nov. 9, 1989 [JP] Japan .................. 1-290077

[51] Int. Cl.$^5$ .............................................. F16H 1/44
[52] U.S. Cl. ........................ 475/231; 475/84; 475/238
[58] Field of Search ............ 475/84, 86, 238, 239, 475/237, 233, 231, 232, 234

[56] References Cited

U.S. PATENT DOCUMENTS

| 4,389,909 | 6/1983 | Goscenki | 475/231 X |
| 4,594,913 | 7/1986 | Opitz | 475/239 X |
| 4,644,823 | 2/1987 | Mueller | 475/86 |
| 4,679,463 | 7/1987 | Ozaki et al. | 475/86 |
| 4,715,248 | 12/1987 | Gant | 475/86 |
| 4,811,628 | 3/1989 | Winkam et al. | 475/86 |
| 4,838,118 | 6/1989 | Binkley | 475/86 |
| 4,876,921 | 10/1989 | Yasui et al. | 475/86 |

FOREIGN PATENT DOCUMENTS

| 3813305 | 11/1988 | Fed. Rep. of Germany | 475/86 |
| 60-580 | 8/1984 | Japan . | |
| 797921 | 1/1981 | U.S.S.R. | 475/84 |

Primary Examiner—Richard Lorence
Assistant Examiner—Khoi Q. Ta
Attorney, Agent, or Firm—Marger, Johnson, McCollom & Stolowitz, Inc.

[57] ABSTRACT

To realize a small-sized differential gear provided with both differential limiting and locking functions simultaneously without markedly modifying the conventional differential case, the differential gear comprises a differential mechanism having a differential case, pinion shafts, pinion gears, two side gears, etc.; two frictional multiplate clutches disposed between the two side gears and two inner side wall surfaces of the differential case, respectively for limiting differential function; a lock clutch disposed within the differential case for generating two opposite direction thrust forces to engage said limit multiplate clutches into engagement and further locking the differential function; and actuator for actuating the lock clutch from outside of the differential case.

4 Claims, 6 Drawing Sheets

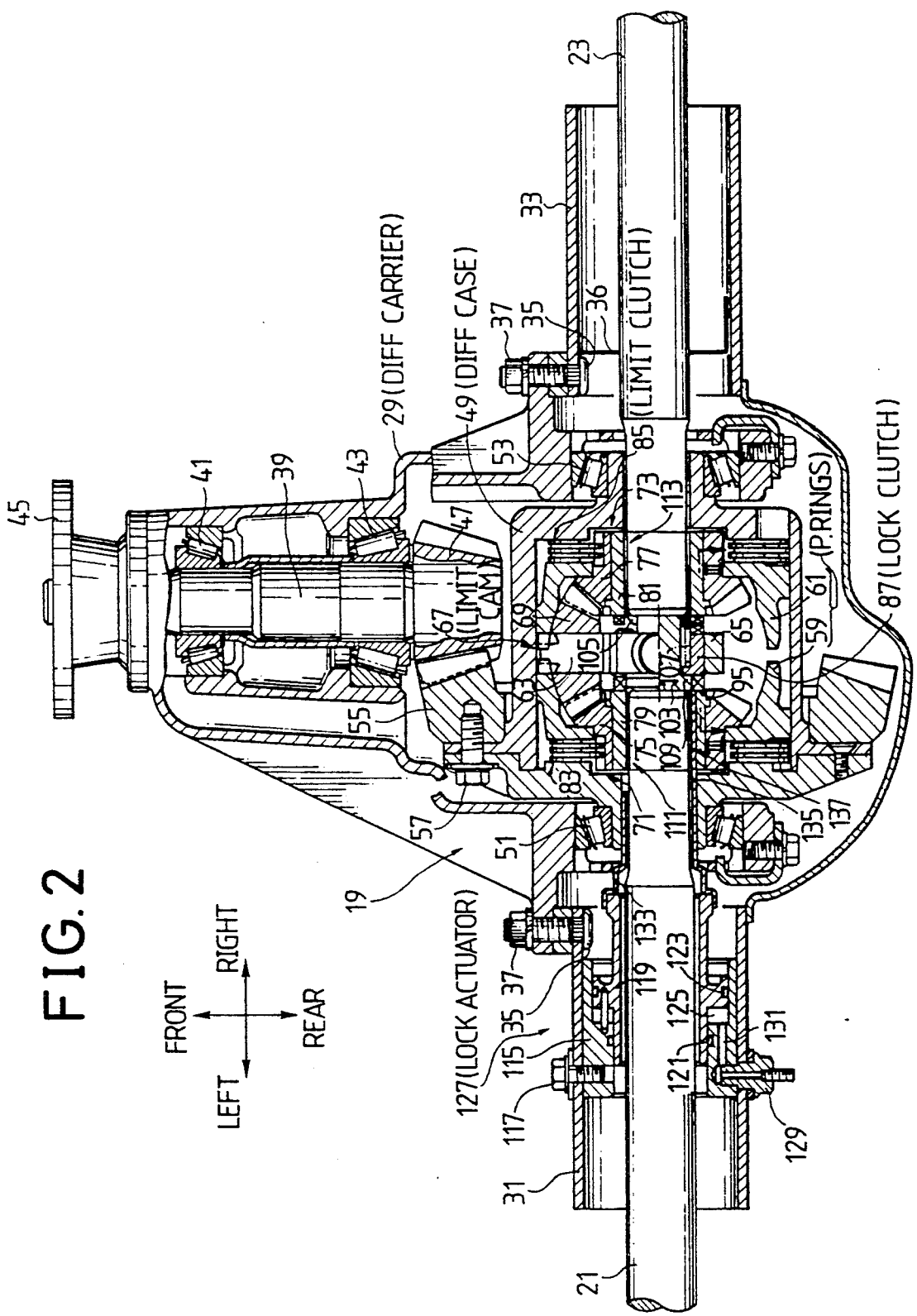

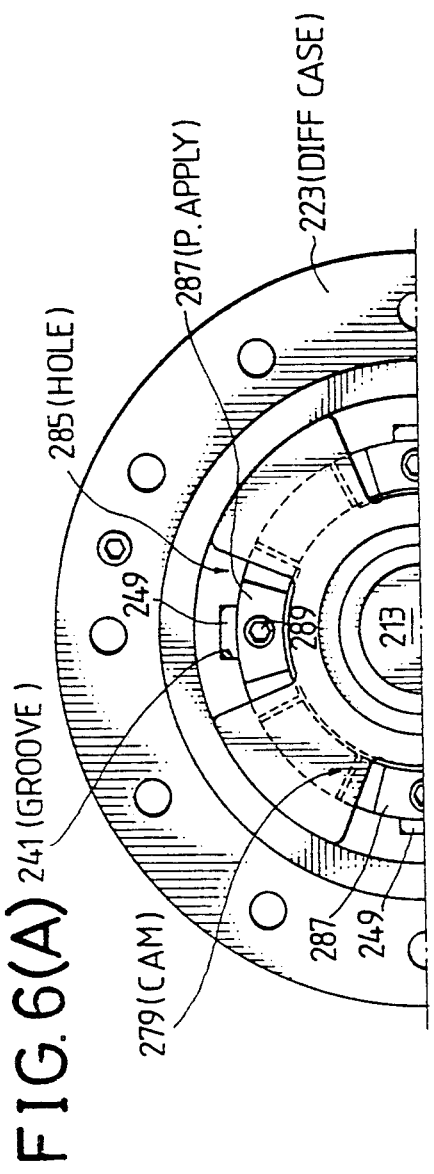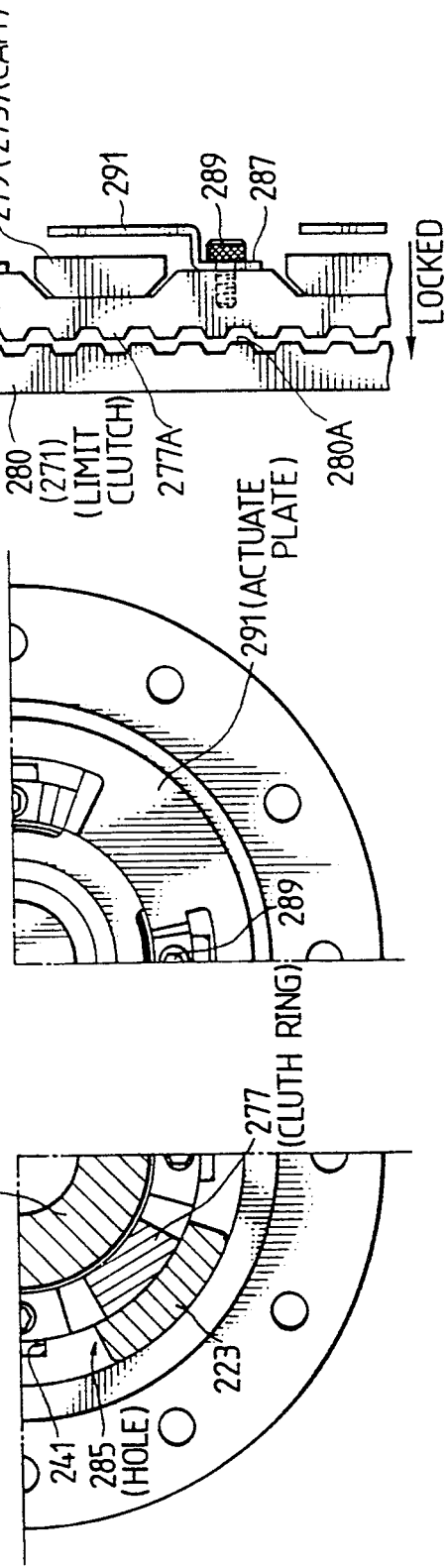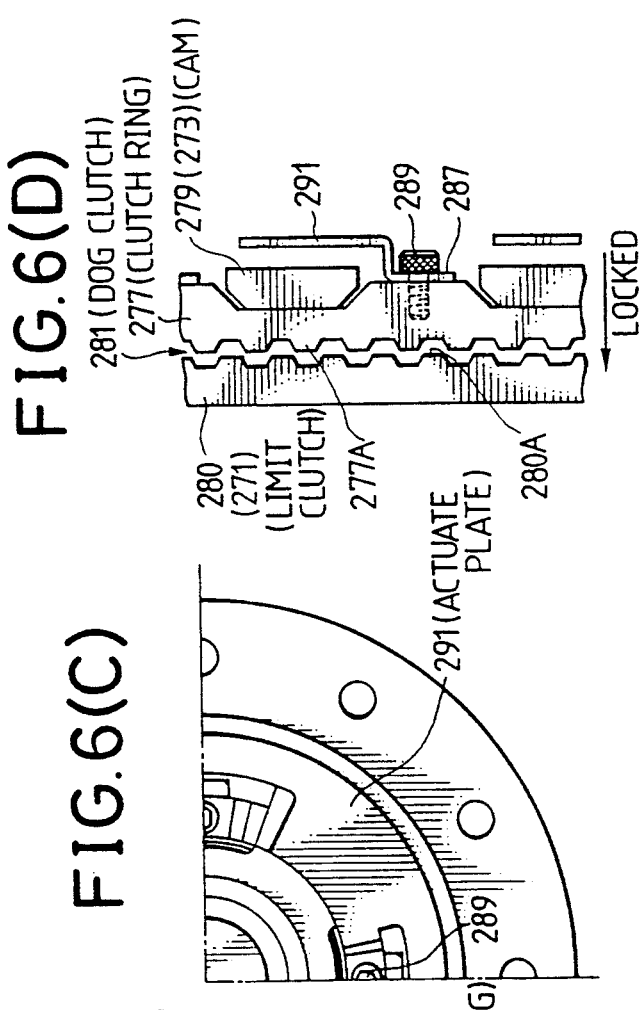

DIFFERENTIAL GEAR WITH LIMITED SLIP AND LOCKUP CLUTCHES

This is a division of application Ser. No. 07/452,862, filed Dec. 19, 1989, now U.S. Pat. No. 5,098,360 issued Mar. 24, 1991.

BACKGROUND OF THE INVENTION

1. Field of the Invention

The present invention relates to a differential gear suitable for use in automotive vehicles, and more specifically to a small-sized differential gear provided with both differential limiting and locking functions,

2. Description of the Prior Art

An example of prior-art differential gears is disclosed in Japanese Published Examined (Kokoku) Application No. 60-580, for instance. In this prior-art differential gear, since a differential case is coupled to two vehicle wheel shafts by means of a dog clutch, the differential function thereof can be locked to facilitate extricating a vehicle form a slippery road.

In the prior-art differential gear as described above, however, although the differential locking function can be attained, it is impossible to attain the differential limiting function on the basis of a frictional force of the clutch, thus raising a problem in the vehicle steering is not stable at sharp corners.

To overcome this problem, certain differential gears for limiting the differential function are proposed, in which a rotative power transmitted from a differential case to a pinion shaft is further applied to a pressure ring via a cam to shift the pressure ring in the axial direction thereof so that a frictional force can be generated between the differential case and the pressure ring via a number of friction plates. In this prior-art differential gear, there exists such an advantage that the differential function can be limited by a frictional force and further the differential limiting force increases with increasing torque inputted to the differential case. In this prior-art differential gear, however, since the differential function is limited only according to an input torque, it is impossible to lock the differential function when required, this resulting in a problem in that it is difficult to allow the vehicle to be extricated from a slippery road.

On the other hand, although it may be possible to simply combine the two above-mentioned differential gears, another problem may occur in that the size of the differential gear is increased, in particular in the width (vehicle front and rear) direction of the differential gear.

SUMMARY OF THE INVENTION

With these problems in mind, therefore, it is the primary object of the present invention to provide a differential gear provided with both differential locking and limiting functions simultaneously without increasing the size thereof and without modifying the differential case markedly.

To achieve the above-mentioned object, the differential gear according to the present invention comprises: (a) a differential mechanism including: (1) a differential case (49, 23); (2) pinion shafts (63, 251) rotatably supported within said differential case; (3) pinion gears (69, 253) rotatably supported by said pinion shafts, respectively; and (40 a pair of said gears (71, 73 or 255, 257) rotatably supported within said differential case in mesh with said pinion gears; (b) multiplate limit clutch means (83, 85 or 269, 271) disposed between said two side gears and two inner side wall surfaces of said differential case respectively, for limiting differential function of said differential mechanism on the basis of rotation of said pinion shafts; (C) lock clutch means (87, 281) disposed within said differential case, for generating two opposite direction thrust forces to bring said limit multiplate clutches into engagement and further locking the differential function of said differential mechanism; and (d) actuator means (127 or 293) disposed outside said differential case, for actuating said lock clutch means via at least one actuating member (119, 135 or 291, 287) arranged passing through at least one space (137 or 285) formed in said differential case.

In the first embodiment of the present invention, said lock clutch means is disposed between said two side gears and comprises: a lock clutch member (87) axially slidably disposed on an outer circumferential surface of a thrust block (103) to which said pinion shafts are fixed, said lock clutch member being formed with first cam projections (91) engageable with second cam projections (93) formed in one of said two side gear (71) and further with third cam projections (92) engageable with fourth cam projections (94) formed in the other of said two side gear (73), and said actuator means (127) comprises: (a) a piston member (119) disposed outside of said differential case so as to be actuated by a hydraulic pressure; (b) a transmission member (133) fixed to said piston member and arranged passing through non-spline spaces formed in one of said two side gears into contact with said lock clutch member, for engaging said lock clutch means when said piston member is actuated; (c) a return spring (107) disposed between said clutch member (87) and one of said side gears, for urging said clutch member so that said lock clutch means can be disengaged when said piston member is deactuated.

In the second embodiment of the present invention, said lock clutch means (281) is disposed between one of said two side gears and a cylindrical recess formed in an inner side wall surface of said differential case and comprises: (a) pressure receiving member (280) axially slidably coupled to said limit multiplate clutch provided for one of said two side gears and formed with first dog clutch projections (280A); (b) a clutch ring (277) axially slidably disposed within a wall thickness space of said differential case and formed with second dog clutch projections (277A) engageable with said first dog clutch projections; and (c) cam members (279) formed at a bottom of the cylindrical recess of said differential case and axially slidably always engaged with said clutch ring (277), and said actuator means (293) comprises: (a) a diaphragm (299) disposed outside said differential case and actuated by a hydraulic pressure applied thereinto; (b) a holding plate (291) fixed to said clutch ring (277) and actuated by said diaphragm to engage said lock clutch means when said diaphragm is actuated; and (c) a return spring (283) disposed between said pressure receiving member and said clutch ring, for urging said clutch ring to disengage said lock clutch means when said diaphragm is deactuated.

In the differential gear according to the present invention, since differential limiting clutches and locking clutch are incorporated within the differential case, the differential function can be limited by the differential limiting multiplate clutches for providing stable vehicle cornering operation, and further the differential function can be locked by the differential locking cam or dog clutch for providing easy vehicle travelling on a slippery road, without increasing the size of the differential gear or without markedly modifying the conventional differential case.

In the first embodiment of the differential gear according to the present invention, since the lock clutch is disposed between the two side gears in symmetry within the differential case and further a lock clutch is composed of a cam clutch, it is possible to balance the differential limiting and locking force or load with respect to both the side gears and further to lock the differential function in cooperation with the frictional multiplate clutches.

In more detail, when the pinion shafts rotate, the two side gears are rotated by the pinion gears. In this case where there exists a difference in drive resistance between the two side gears, the rotating power is differentially distributed to the two side gears in dependence upon the rotation of the pinion gears around their own axes.

Since the pinion gears are in mesh with the two side gears in bevel gear manner, two thrust forces can be generated in two opposite directions to engage the two frictional multiplate clutches for providing a differential limitation.

On the other hand, when the cam projection lock clutch is engaged, the two side gears are locked to transmit the same torque to both the side gears for providing a differential lock. Under these locking conditions, since two thrust forces can be also generated to move the two side gears in two opposite directions at each engagement location of cam protections of the lock clutch, it is possible to distribute the locking force or load to both the frictional limiting multiplate clutches and the cam locking clutch, thus decreasing the size of these clutches under good balanced conditions.

In the second embodiment of the differential gear according to the present invention, since the dog lock clutch is disposed in a recessed portion formed in an inner side wall of the differential case, it is possible to arrange the dog lock clutch by utilization of the wall thickness space of the differential case. Therefore, it is possible to design the dog clutch having a sufficient clutch tooth height in the axial direction and a large diameter in the transversal (width) direction of the differential gear. In addition, lubricant can be sufficiently supplied to each gear mesh positions through holes into which the lock clutch ring is fitted.

BRIEF DESCRIPTION OF THE DRAWINGS

The features and advantages of the differential gear according to the present invention will be more clearly appreciated from the following description taken in conjunction with the accompanying drawings in which:

FIG. 2 is a cross-sectional view showing a first embodiment of the differential gear according to the present invention;

FIG. 6(A) is a cross-sectional view taken along the lines A—A in FIG. 5, for assistance in explaining the right side of the differential case;

FIG. 6(B) is a cross-sectional view taken along line B—B in FIG. 5, for assistance in explaining the clutch ring;

FIG. 6(C) is a cross-sectional view taken along the lines C—C in FIG. 5, for assistance in explaining the holding plate; and FIG. 6(D) is a cross-sectional view taken along the line D—D in FIG. 5, for assistance in explaining the dog clutch.

DETAILED DESCRIPTION OF THE PREFERRED EMBODIMENTS

A first embodiment of the present invention will be described hereinbelow with reference to FIGS. 1 to 3.

Figure 1:
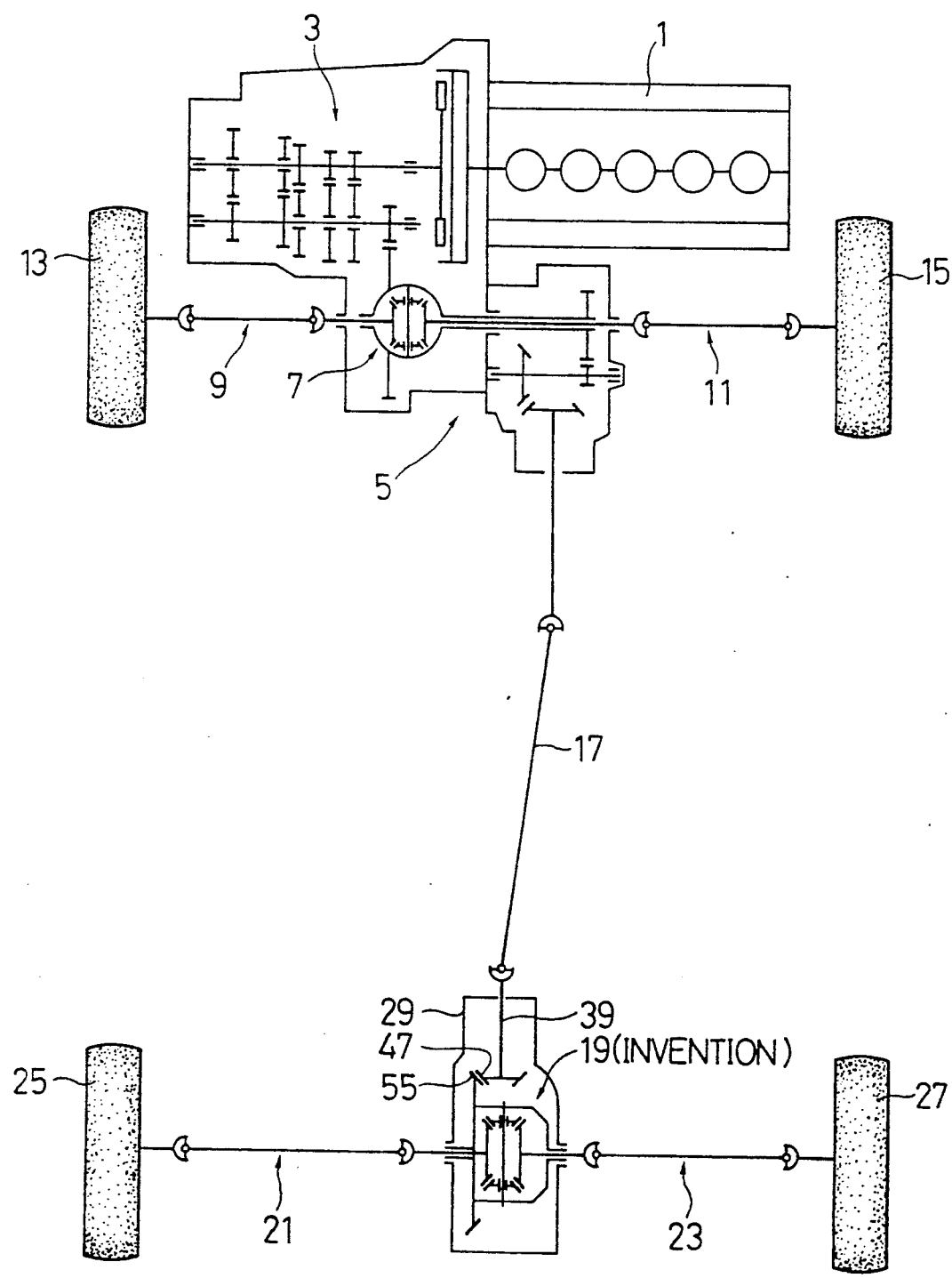
FIG. 1 is a skeletal mechanism diagram showing a vehicle power system to which a first embodiment of the differential gear according to the present invention is applied.

FIG. 1 shows a power transmission system of a front-engine four-wheel drive (4WD) vehicle to which the first embodiment of the present invention is applied. The power system shown in FIG. 1 comprises an engine 1, a transmission 3, a transfer 5, a front (front wheel side) differential gear 7, two (left and right) front wheel shafts 9 and 11, two (left and right) front wheels 13 and 15, a propeller shaft 17, a rear (rear wheel side) differential gear 19 according to the present invention, two (left and right) rear wheel shafts 21 and 23, and two (left and right) rear wheels 25 and 27.

In the first embodiment, since a lock clutch member is disposed between two side gears in symmetrical positional relationship within a differential case and further a lock clutch is composed of a cam clutch, the differential limiting and locking force can be well balanced with respect to both the side gears. Further, the differential function is limited and locked in cooperation with the frictional multiplate clutches and the lock clutch.

In more detail with reference to FIG. 2, two rear wheel drive shaft pipes 31 and 33 are fixed to a differential carrier 29 on both the sides thereof with bolts 35 and nuts 37. Further, a baffle plate 36 is disposed within the right shaft pipe 33. A drive pinion shaft 39 is rotatably supported via two bearings 41 and 43 by the differential carrier 29. A flange member 45 is spline coupled to the front end of the drive pinion shaft 39, and a drive pinion gear 47 is formed integral with the rear end of the same shaft 39. Further, a flange member 45 is fixed to a propeller shaft 17 shown in FIG. 1.

A differential case 49 is rotatably supported via two bearings 51 and 53 within the differential carrier 29. A ring gear 55 is fixed to this differential case 49 with bolts 57, and this ring gear 55 is in mesh with the drive pinion gear 47. As described above, the differential case 49 is rotated by a driving power from the engine 1 by way of the drive pinion shaft 39, the pinion gear 47 and the ring gear 55.

A pair of pressure rings 59 and 61 are axially slidably disposed in contact with the inner circumferential surface of the differential case 49. Further, four pinion shafts 63 (only one is shown) are fixed to the coupling ring 65 in cross state and supported by limit cam members 67 each disposed between each free end of each pinion shaft 63 and the two pressure rings 59 and 61 in order to limit the differential function by two multiplate limit clutches 83 and 85. When the differential case 49 rotates, a thrust force is generated at the limit cam members 67 due to the rotational resistance between pinion gears 69 and two sides gears 71 and 73, so that the pressure rings 59 and 61 are shifted in both the axially opposite right and left directions.

Each pinion gear 69 is rotatably supported by each pinion shaft 63 in mesh with a pair of side gears 71 and 73 arranged coaxially with the differential case 49. Each side gear 71 or 73 is composed of each outer cylindrical member 75 or 77 formed with a gear meshed with the pinion gears 69, respectively and each inner cylindrical member 79 or 81 fixed to the two outer cylindrical member 75 or 77. The side gears 71 and 73 are axially shifted to the right or the left direction due to a thrust force generated by the engagement with the pinion gears 69 to shift the pressure rings 59 and 61 on both the opposite directions, as already described.

Multiplate limit clutches 83 and 85 (frictional clutches) are disposed between each side gear 71 or 73 and the differential case 49. Some frictional plates are spline coupled to the outer cylindrical member 75 or 77 and some other frictional plates are spline coupled to the differential case 49 alternately in juxtaposed positional relationship with respect to each other. These multiplate clutches 83 and 85 are engaged to limit the differential function by the afore-mentioned axial thrust force generated at the limit cam members 67 formed between the two side gears 71 and 73 (or 75 and 77) and transmitted to both the pressure rings 59 and 61, respectively.

Figure 3A:
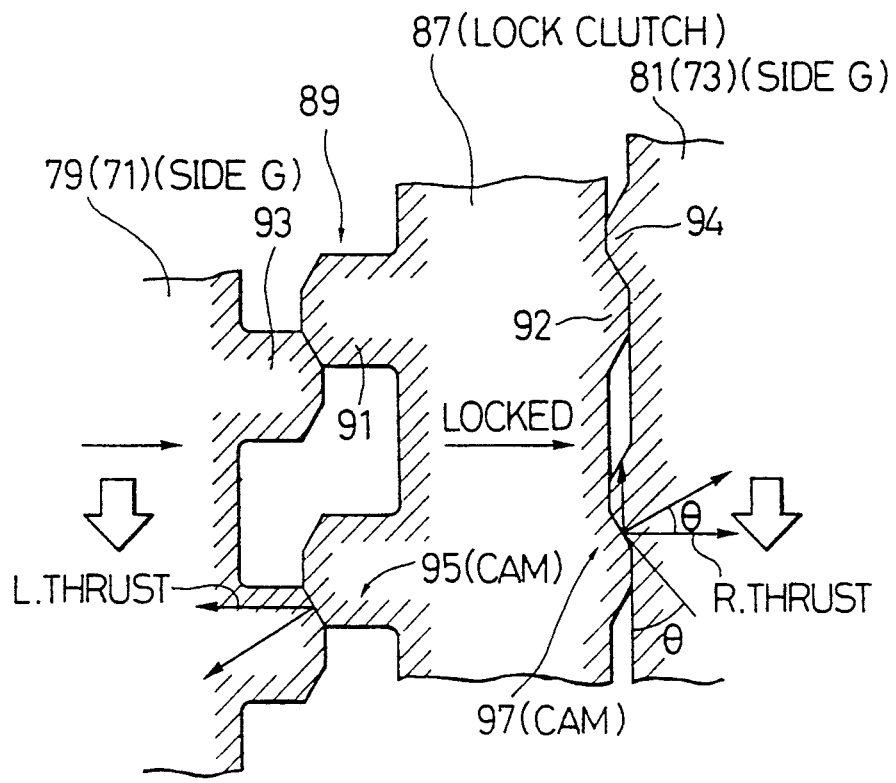
FIG. 3(A) is an enlarged development view taken along the line III—III in FIG. 2 for assistance in explaining the locking mechanism of a clutch member disposed between two side gear, in which the differential function can be locked.
Figure 3B:
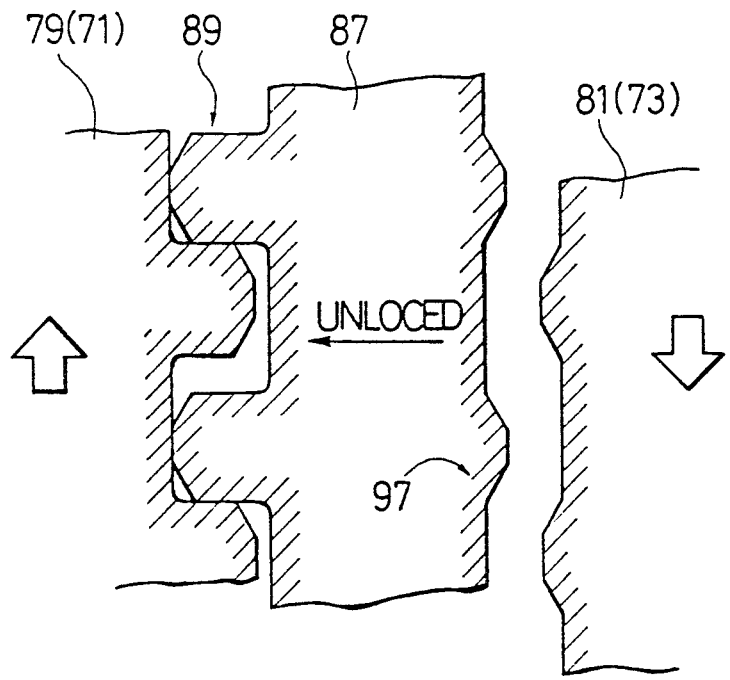
FIG. 3(B) is a similar enlarged development view for assistance in explaining the locking mechanism of a clutch member disposed therebetween, in which the differential function can be unlocked.

An annular lock clutch member 87 is axially movably disposed between the two opposing surfaces of the two inner cylindrical members 79 and 81 of the two side gears 71 and 73 in contact with the inner circumferential surface of the coupling shaft 65. As shown in FIGS. 3(A) and 3(B), a relief space 89 is formed between the lock clutch member 87 and the left side gear 71 so that convex portions (projections) of one member can be loosely engaged with concave portions of the other member or vice versa. A left side cam portion 95 is formed between the convex portions (projection) 91 of the lock clutch member 87 and those 93 of the left side gear 71, and a right side cam portion 97 is formed between the convex portions (projections) 92 of the lock clutch member 87 and those 94 of the right side gear 73. Therefore, when the lock clutch member 87 is axially moved in the rightward direction via the left side gear 71, as shown in FIG. 3(A), into the lock clutch engagement, since both the inner cylindrical member 79 and 81 (i.e. both the side gears 71 and 73) are engaged with each other at both the cam portions 95 and 97, the differential function is disabled or locked, so that the two side gears 71 and 73 are rotated in the same rotational direction as shown by thick arrows. On the other hand, when the lock clutch member 87 is axially returned in the leftward direction by a helical return spring 107 disposed on the inner circumferential surface of the lock clutch member 87, as shown in FIG. 3(B), into lock clutch disengagement, since both the inner cylindrical members 79 and 81 (i.e. both the side gears 71 and 73) are disengaged from each other at the right cam portion 97, the differential function is enabled or unlocked, so that the two side gears 71 and 73 can be rotated differentially as shown by thick arrows.

A thrust block 103 is disposed on the inner circumferential surface of the lock clutch member 87. Further, a retainer 105 is rotatably disposed on the side surface of the inner cylindrical member 81 (spline coupled to the right wheel shaft 23) on the right side gear (73) side. A return spring 107 for urging the lock clutch member 87 in the leftward direction is disposed between the retainer 105 and an inner flange of the clutch member 87. Further, an outer flange 109 formed integral with the thrust block 103 is used in common as a stopper for restricting the leftward position of the clutch member 87.

To the inner cylindrical member 79 and 81 of the side gears 71 and 73, the right and left rear wheel shafts 21 and 23 are coupled via splines 111 and 113 formed therebetween so as to be axially movable relative to each other. The thrust block 103 transmits two relative thrust forces generated between these two wheels shafts 21 and 23.

A lock actuator 127 is arranged on the left side of the differential gear. A cylindrical member 115 is fixed to the inner circumferential surface of the left wheel shaft pipe 31 with bolts 117. A cylindrical piston member 119 is axially slidably fitted into this cylindrical member 115.

A pressure chamber 125 is formed between these two cylindrical members 115 and 119 by two O-rings 121 and 123 under a liquid tightness condition so as to construct an annular hydraulic lock actuator 127. A hydraulic pressure is supplied to the pressure chamber 125 from a hydraulic port 129 and via an oil passage 131 to move the piston member 119 toward the rightward direction.

A cylindrical transmission member 133 is rotatably disposed on the right side of the piston member 119. An arm 135 is formed on the right side of this transmission member 133. This arm 135 extends partially into contact with the lock clutch member 87 by passing through absence portions of the splines formed between the left side gear 71 (or the left inner cylindrical member 79) and the left rear wheel shaft 21.

When a hydraulic pressure is supplied into the hydraulic actuator 127, the lock clutch member 87 is moved in the rightward direction via the piston member 119, the transmission member 133, and the arm 135, in order to lock the two side gears 71 and 73. When the hydraulic pressure is not supplied, since the lock clutch member 87 is returned toward the leftward direction by an elastic force of the return spring 107, the locking state between the two side gears 71 and 73 is released.

The above-mentioned operation of the hydraulic actuator 127 can be controlled manually by a driver or automatically according to the vehicle steering and road surface conditions or the rotational difference between the two rear wheel shafts 21 and 23.

The function of the first embodiment will be described hereinbelow. When the differential case 49 is rotated by an engine power, this rotational force is transmitted to the left and right wheels 25 and 27 via the pressure rings 59 and 61, the limit cam portion 67, the pinion shafts 63 and the pinion gears 69, to rotate the left and right rear wheels 25 and 27. Where there exists a rotative difference between the two rear wheels 25 and 27, the two side gears 71 and 73 rotate differentially by the rotations of the pinion gears 69 about their own axes, so that the engine power is differentially distributed to the right and left rear wheels 25 and 27. Under these conditions, the two pressure rings 59 and 61 engage the multiplate limit clutches 83 and 85 by two right and left axial thrust forces respectively generated at the limit cam portion 67 between the pinion shaft (63) ends and the pressure ring (59, 61) end and simultaneously at the gear mesh between the pinion gears 69 and the side gears 71 and 73. This thrust forces restrict the differential rotation between the two rear wheels 25 and 27, so that a large torque can be transmitted to the rear wheel of a large rotating resistance, without concentrating torque only to the other rear wheel of a small rotating resistance.

Therefore, in case the vehicle is running on a slippery road and therefore one of the rear wheels slips, the differential limiting function by the rear differential gear 19 allows to transmit power to the other of the non-slipping rear wheel, so that the vehicle can maintain a smooth running without stuck condition or to run away from a slippery road, thus improving the vehicle running performance.

For instance, when the vehicle is turned by an external force during travel on an uneven road, the differential limiting function of the rear differential gear 19 decreases the rotative speed of the outward rotating rear wheel, and increases the rotative speed of the inward rotating rear wheel by the rotation of the outward rotating rear wheel, so that a moment can be generated to return the vehicle to the original normal position, thus improving the vehicle straight travelling stability.

When a hydraulic pressure is supplied to the hydraulic lock actuator 127 to shift the lock clutch member 87, since the side gears 71 and 73 are locked, the differential function between the two rear wheels is disabled or locked. When a hydraulic pressure is not supplied to the hydraulic lock actuator 127, since the lock clutch member 87 returns to its original position by an elastic force of the return spring 107, the locking condition between the two side gears 71 and 73 is released or unlocked. Under these conditions, since the differential function between the two inward and outward rotating rear wheels is enabled, the vehicle can be tuned smoothly.

Further, it is possible to adjust the ratio in limiting or locking force of the lock clutch member 87 to the two multiplate limit clutches 83 and 85 by changing the projection edge angles of the cam portions 95 and 97 formed in the lock clutch member 87. For instance, if the angle $\theta$ is decreased, the load to the multiplate clutches 83 and 85 increases and therefore the load to the clutch member 87 decreases. Further, it is possible to change the angles $\theta$ of the cam portions 95 and 97 simultaneously or separately. As described above, since the locking force can be partially received by the multiplate limit clutches 83 and 85, no excessive strength is required for the lock clutch member 87 and therefore the cam portions 95 and 97. Therefore, it is unnecessary to increase the size of the lock clutch member 87 or the differential gear 19. Further since the locking mechanism can be interposed in a space between the two side gears 71 and 73 so that the two side gears 71 and 73 are coupled to each other in the conventional way, a load is uniformly applied to both the side gears, and further it is unnecessary to modify the differential case and therefore it is possible to obtain the compatibility with the conventional differential gear. In addition, since the locking mechanism actuating means (by hydraulic actuator) 27 is disposed within the wheel shaft tube 31, it is unnecessary to change the differential carrier 29, thus maintaining the compatibility with the conventional differential gear. Further, since no outward projecting elements such as a fork or lever are provided, there exits no problem with interference with other peripheral members, thus providing an easy layout of vehicle components.

As described above, in the differential gear according to the first embodiment, it is unnecessary to increase the size of these clutch members to increase the strength thereof, so that the size of the differential gear can be reduced. Further, since the supporting force of the locking mechanism and the load of the locking force are not one-sided upon one of the side gears, the locking force balancing can be maintained, without markedly modifying the conventional differential case.

Figure 4:
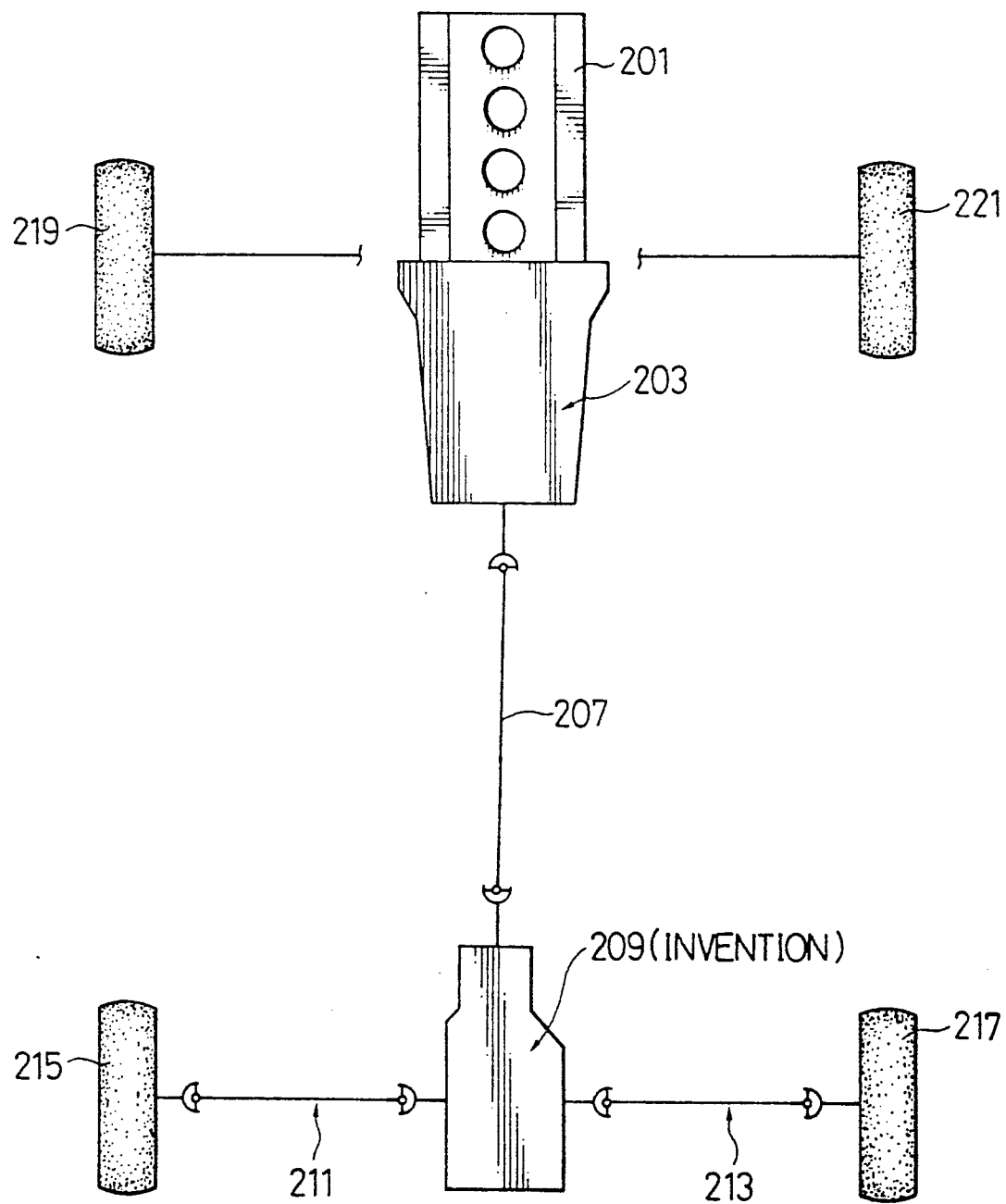
FIG. 4 is another skeletal mechanism showing another vehicle power system to which a second embodiment of the differential gear according to the present invention is applied.

A second embodiment of the present invention will be described hereinbelow with reference to FIGS. 4 to 6. FIG. 4 shows a vehicle power system to which the second embodiment of the present invention is applied. The power system is composed of an engine 201, a transmission 203, a propeller shaft 207, a rear differential gear 209 according to the present invention, two rear wheel shafts 211 and 213, left and right rear wheels 215 and 217, left and right front wheels 219 and 221, etc.

In this second embodiment, a lock (dog) clutch member is disposed in a recess formed in an inner side wall of the differential case; that is, the lock clutch member is arranged by utilization of the wall thickness of the differential case.

Figure 5:
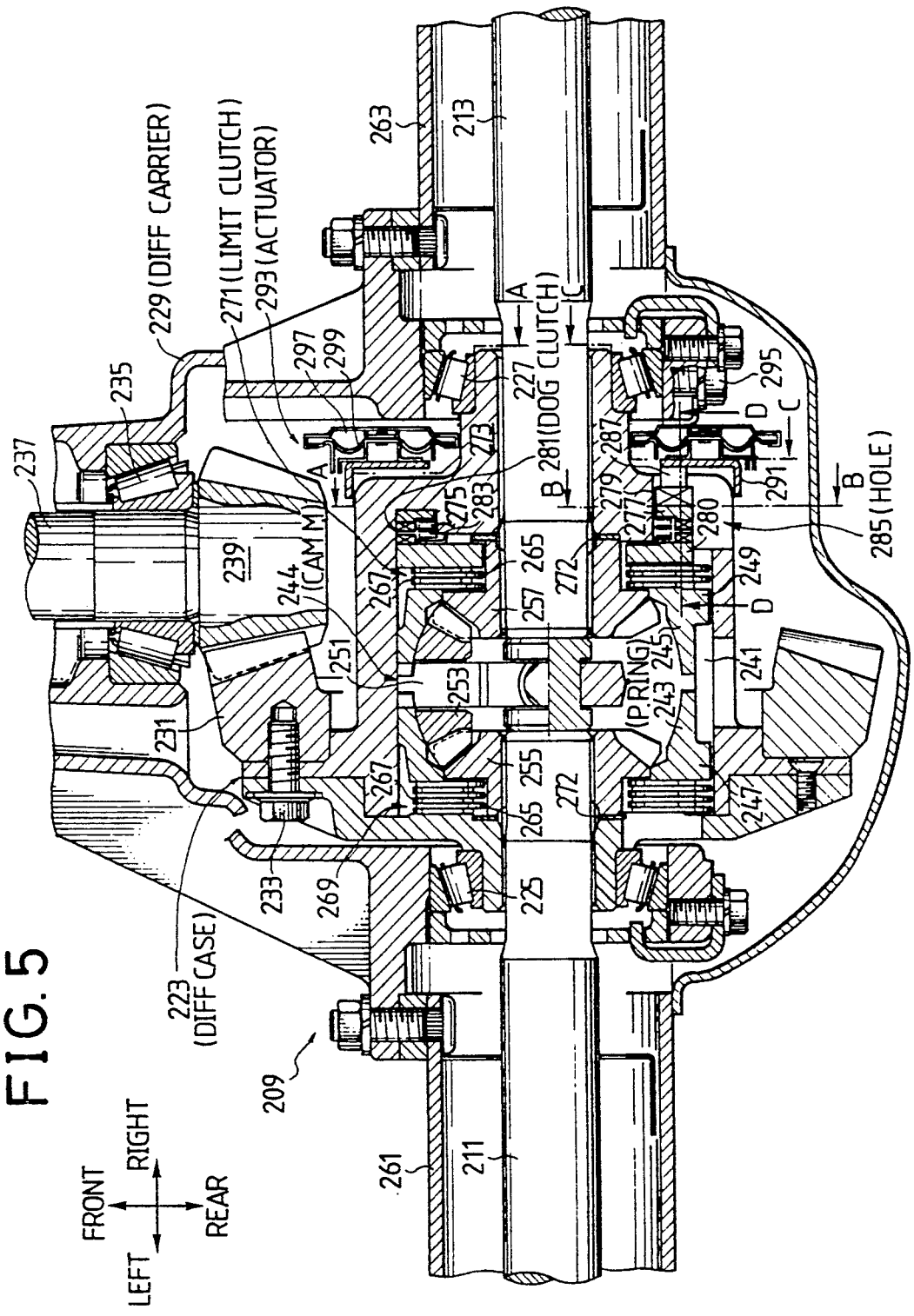
FIG. 5 is a cross-sectional view showing a second embodiment of the differential gear according to the present invention.

With reference to FIG. 5, two rear wheel drive shaft pipes 261 and 263 are fixed to a differential carrier 229 with bolts and nuts. A differential case 223 of the rear differential gear 209 is rotatably supported by bearings 225 and 227 within the differential carrier 229. A ring gear 231 is fixed to the differential case 223 with bolts 233. This gear 231 is in mesh with a drive pinion gear 239 formed integral with a rear end of a drive pinion shaft 237 rotatably supported via a bearing 235 by the differential carrier 229 so as to be coupled to the propeller shaft 207. As described above, the differential case 223 is rotated by an engine driving power.

At the bottom of the differential case 223, an axial groove 241 is formed, to which two projection portions 247 and 249 of two pressure rings 243 and 245 are fitted so as to be axially movable therein. Pinion shafts 251 are supported between the two pressure rings 243 and 245, and a cam member 244 is formed between these pressure rings 243 and 245 to apply rightward and leftward thrust forces to these rings 243 and 245, respectively.

A pinion gear 253 is rotatably supported by the pinion shaft 251 so as to be in mesh with the left and right side gears 255 and 257 (the output members) to constitute a differential mechanism. Each side gear 255 or 257 is spline engaged with each rear wheel shaft 211 or 213 housed within the left and right wheel shaft pipe 261 or 263, respectively.

Therefore, when the differential case 223 is rotated by an engine power, the rotative force is transmitted to the left and right rear wheels 215 and 217 by way of pressure rings 243 and 245, the cam member 244, the pinion shafts 251, the pinion gears 253, the two side gears 255 and 257 on the basis of the rotation of the pinion gears 253 around their own axes.

Multiplate limit clutches 269 and 271 are provided between the two side gears 255, 257 and the differential case 223. The left limit clutch 269 is composed of plural friction plate 265 spline coupled to the left side gear 255 and plural friction plate 267 spline coupled to the differential case 223 in alternately juxtaposed positional relationship to each other. The right limit clutch 271 is composed of plural friction plate 265 spline coupled to the right side gear 257 and plural friction plates 267 spline coupled to the differental case 223 in alternately juxtaposed positional relationship to each other. These clutches 269 and 271 are engaged between the pressure rings 243, 245 and the differential case 223 by a pressure obtained by a thrust force of the pressure rings 243 and 245. Since the rotation of the pinion gears 253 around their own axes can be limited according to the above engagement force, the differential function of the differential mechanism can be limited. Further, since washers 272 are disposed between the two side gears 255, 257 and the differential case 223, the thrust force generated between each side gear 255 or 257 and the pinion gears 253 will be applied to each multiplate limit clutch 269 or 271.

A concave portion 275 is formed in the right side wall 273 of the differential case 233, so that the clutch ring 277 (dog clutch member) is movable in the axial direction. A cam 279 as shown in FIGS. 5 and 6(d) is formed between the right innermost surface of this recessed portion 275 and the clutch ring 277. Further, a dog clutch 281 is formed between the left end surface of the clutch ring 277 and the right end surface of a pressure receiving member 280 of the limit clutch 271. The pressure receiving member 280 is spline coupled with the side gear 257 by the same splines for the friction plate 265 of the multiplate clutch 271. The dog clutch 281 is engaged when the clutch ring 277 is moved in the leftward direction, and disengaged when moved in the rightward direction (as shown). Since the height (axial length) of the cam 279 is larger than the axial stroke of the pressure ring 277 as shown, the cam 279 is always kept engaged, so that the clutch ring 277 and the differential case 223 are always coupled with each other.

Therefore, when the dog clutch 281 is engaged, the cam 279 operates to disable or lock the differential mechanism, because the side gear 257 and the differential case 223 are coupled by the engagement of the multiplate limit clutches 269 and 271 by the clutch ring 277 so as not to be rotatable relative to each other.

A return spring 283 for urging the clutch ring 277 in the rightward direction is disposed between the clutch ring 277 and the pressure receiving member 280. Further, as shown in FIGS. 6(A) and (B), a machining hole 285 (communication hole) communicating between the inside and the outside of the differential case 223 is formed at an extension of the groove 241 and on the righthand end side of the differential case 223. A pressure applying member 287 of an actuation plate 291 passing through the hole 285 is fixed to the clutch ring 277 with bolts 289 as shown in FIGS. 6(C) and (D). The hole 285 is formed in the recessed portion 275.

An annular actuator 293 is disposed on the right side of the actuation plate 291 and fixed to the differential carrier 229 with bolts 295. A hydraulic pressure is supplied from a pressure source to this actuator 293 via a control valve device (not shown). When a hydraulic pressure is supplied to a pressure chamber 297 of the actuator 293, since the diaphragm 299 is deformed toward the left side, the clutch ring 277 is moved in the leftward direction via the actuation plate 291 against an elastic force of the return spring 283 to bring the dog clutch 281 into engagement. However, when the pressure is not supplied, the clutch ring 277 is returned to the rightward direction by an elastic force of the return spring 283 to release the dog clutch 281. The control valve device as described above can be operated manually by the driver or automatically according to the vehicle steering or road conditions. The differential locking mechanism is thus constructed.

The function of the second embodiment will be explained in relation to the vehicle power system shown in FIG. 4. When the differential locking mechanism of the rear differential 209 is released or unlocked, the differential function of the differential mechanism between the two rear wheels 215 and 217 is enabled on the basis of the differential function, so that a vehicle can be smoothly turned.

When the vehicle is accelerated as when started, since a torque is applied to the cam 244 between the pinion shafts 251 and the pressure rings 243 and 245 due to an engine torque and a driving resistance of the rear wheels 215 and 217, the multiplate limit clutches 269 and 271 are engaged by the thrust forces of the pressure rings 243 and 245; so that the function of the differential gear is limited between the two rear wheels 215 and 217 to improve the vehicle straight travelling stability. Further, when the differential locking mechanism is actuated, since the differential gear 209 is locked to disable the differential function, the straight travelling stability can be further improved.

Further, when one of the rear wheels slips on a slippery road, for instance, since the differential function is disabled by the differential locking mechanism, a driving power can be transmitted to the other non-slipping rear wheel, so that it is possible to improve the bad-road travelling performance without being brought into stuck conditions.

As described above, in the differential gear according to the second embodiment, since the clutch ring 277 of the differential locking mechanism is disposed within the recessed portion 275 formed in the differential case 223 by utilizing the wall thickness of the side wall 273 thereof, it is possible to provide a necessary height (axial length) to the teeth (projections) of the cam 279 and the dog clutch 281 without increasing the size of the rear differential gear 209 in the width (vehicle front and rear) direction, because there exists a sufficient space in the axial direction. In addition, the lubricant enclosed within the differential carrier 229 and stirred by the rotation of the ring gear 233 can be sufficiently supplied to the clutches 267 and 281 through the hole 285 communicating between the recessed portion 275 of the differential case 223 and the outside. Further, cam teeth is formed by utilization the space of the same hole 285 already formed in the differential case 223, being different from the conventional gear, these cam teeth can be formed integrally with the differential case 223, without forging a different side wall and the cam teeth separately and then welding these two parts, thus it being possible to reduce the cost thereof.

Further, without being limited to the above embodiments, the differential mechanism can be formed by different types such as planetary gear type, and it is also possible to dispose the cam 279 between the clutch ring 277 and the pressure receiving member 280 and further the dog clutch 281 between the clutch ring 277 and the differential case 223. In this case, the dog clutch 281 is engaged by the return spring 283, and released by the urging pressure of the actuator 293.

As described above, in the differential gear according to the present invention, since the lock clutch mechanism of the differential gear can be arranged in the recessed portion of the side wall of the differential case, the differential gear can be reduced in size along the width (vehicle front and rear) direction and further a height (axial length) of the clutch teeth can be increased sufficiently. Further, since the communication hole is formed in the machining hole, lubricant can be sufficiently supplied.

Further, the present invention is not limited to the above embodiments. For instance, in differential gears of such a type that a power is directly transmitted from a differential case to a pinion shaft, it is possible to obtain the same differential limiting and locking function in such a way that frictional clutches are disposed between the side gears and the differential case to attain a differential limiting function on the basis of a thrust force of the side gears and additionally a lock clutch is used as a differential locking mechanism by operating the cam means by an actuator.

As described above, in the differential gear according to the present invention, since the differential limitation operation can be attained by the frictional clutches, it is possible to stabilize the vehicle cornering. Further, when the cam clutch means is engaged by an actuator, since the cam locking thrust force can be further increased due to the differential rotation of the differential gear, it is possible to further limit the differential operation. That is since the differential locking function can be attained by operating the frictional multiplate clutches in cooperation with the cam lock clutch actuated by the actuator, it is possible to realize the differential gear provided with both differential limiting and locking operations without increase the size thereof of the differential gear.

What is claimed is:
1. A differential gear comprising:
 (a) a differential mechanism including:
  (1) a differential case (49, 223);
  (2) pinion shafts (63, 251) rotatably supported within said differential case;
  (3) pinion gears (69, 253) rotatably supported by said pinion shafts, respectively; and
  (4) a pair of side gears (71, 73 or 255, 257) rotatably supported within said differential case in mesh with said pinion gears;
 (b) multiplate limit clutch means (83, 85 or 269, 271) disposed between said two side gears and two inner side wall surfaces of said differential case, respectively, for frictionally engaging one to said side gear with respective said inner sidewall surfaces for limiting the differential function of said differential mechanism;
 (c) first engaging means for providing a first axial force for engaging said limit clutch means for limiting the different action of said differential, said first engaging means responsive to differing rotation of said side gears relative to each other;
 (d) lock clutch means (87, 281) disposed within said differential case, for rotatably interconnecting one said side gear to said case, and for generating a second axial force for further engaging said limit clutch means for further locking the differential function of said differential mechanism; and
 (e) actuator means (127 or 293) disposed outside said differential case, for actuating said lock clutch means via at least one actuating member (119, 135 or 291, 287) passing through at least one space (137 or 285) formed in said differential case.

2. The differential gear of claim 1. wherein said lock clutch means (281) is disposed between one of said two side gears and a cylindrical recess formed in an inner side wall surface of said differential case, said lock clutch means comprising:
 (a) pressure receiving member (280) axially slidably coupled to said limit multiplate clutch provided for one of said two side gears and formed with first dog clutch projections (280A);
 (b) a clutch ring (277) axially slidably disposed within a wall thickness space of said differential case and formed with second dog clutch projections (277A) engageable with said first dog clutch projections; and
 (c) cam members (279) formed at a bottom of the cylindrical recess of said differential case and axially slidably always engaged with said clutch ring (277).

3. The differential gear of claim 2, wherein said actuator means (293) comprises:
 (a) a diaphragm (299) disposed outside said differential case and actuated by a hydraulic pressure applied thereinto;
 (b) a holding plate (291) fixed to said clutch ring (277) and actuated by said diaphragm to engage said lock clutch means when said diaphragm is actuated; and
 (c) a return spring (283) disposed between said pressure receiving member and said clutch ring, for urging said clutch ring to disengage said lock clutch means when said diaphragm is deactuated.

4. A differential gear comprising:
 (a) a differential mechanism including:
  (1) a differential case (223);
  (2) pinion shafts (251) rotatably supported within said differential case;
  (3) pinion gears (253) rotatably supported by said pinion shafts, respectively; and
  (4) a pair of side gears (255, 257) rotatably supported within said differential case in mesh with said pinion gears;
 (b) two frictional multiplate limit clutches (269, 271) disposed between said two side gears and two inner side wall surfaces of said differential case, respectively, for frictionally engaging one of said side gear with one of said inner sidewall surfaces for limiting the differential function of said differential mechanism;
 (c) first engaging means for providing a first axial force for engaging said limit clutch means for limiting the differential action of said differential, said first engaging means responsive to differing rotation of said side gears relative to each other;
 (d) lock clutch means (281) disposed between one of two side gears and a cylindrical recess formed in one inner wall surface of said differential case, for rotatably interconnecting one said side gear to said case, and for generating a second axial force for further engaging said limit clutch means for locking the differential function of said differential mechanism, including:
  (1) a pressure receiving member (280) axially slidably coupled to one of said limit multiplate clutch and formed with first dog clutch projections (280A);
  (2) a clutch ring (277) axially slidably disposed within a wall thickness space of said differential case and formed with second dog clutch projections (277A) engageable with said first dog clutch projection; and (3) cam member (279) formed in said differential case in contact with said clutch ring;

(e) actuator means (293) including:

(1) a diaphragm (299) disposed outside said differential case and actuated by a hydraulic pressure applied thereinto;

(2) a holding plate (291) fixed to said clutch ring (277) and actuated by said diaphragm to engage said lock clutch means when said diaphragm is actuated; and (3) a return spring (283) disposed between said pressure receiving member and said clutch ring, for urging said clutch ring to disengage said lock clutch means when said diaphragm is deactuated.

* * * * *

UNITED STATES PATENT AND TRADEMARK OFFICE
CERTIFICATE OF CORRECTION

PATENT NO. : 5,125,876
DATED : June 30, 1992
INVENTOR(S) : Hirota

It is certified that error appears in the above-identified patent and that said Letters Patent is hereby corrected as shown below:

Column 1    Line 22, change "form" to --from--;

Column 1    Line 44, change "this" to --thus--;

Column 1    Line 63, change "23" to --223--;

Column 1    Line 66, change "(40) " to --(4)--;

Column 7    Line 42, change "tuned" to --turned--;

Column 8    Line 3, change "exits" to --exists--;

Column 9    Line 20, change "233" to --223--;

Column 9    Line 35, change "pressure" to --clutch--;

UNITED STATES PATENT AND TRADEMARK OFFICE
CERTIFICATE OF CORRECTION

PATENT NO. : 5,125,876
DATED : June 30, 1992
INVENTOR(S) : Hirota

It is certified that error appears in the above-identified patent and that said Letters Patent is hereby corrected as shown below:

Column 11    Claim 1, Line 49, change "to" to --of--;

Column 11    Claim 1, Line 50, change "gear with respective" to --gears with one of--;

Signed and Sealed this

Seventeenth Day of August, 1993

Attest:

BRUCE LEHMAN

*Attesting Officer    Commissioner of Patents and Trademarks*